No. 886,951. PATENTED MAY 5, 1908.
J. P. & J. F. J. COSTIGAN.
MOLDING MACHINE.
APPLICATION FILED OCT. 15, 1907.
5 SHEETS—SHEET 1.
Fig. 1,
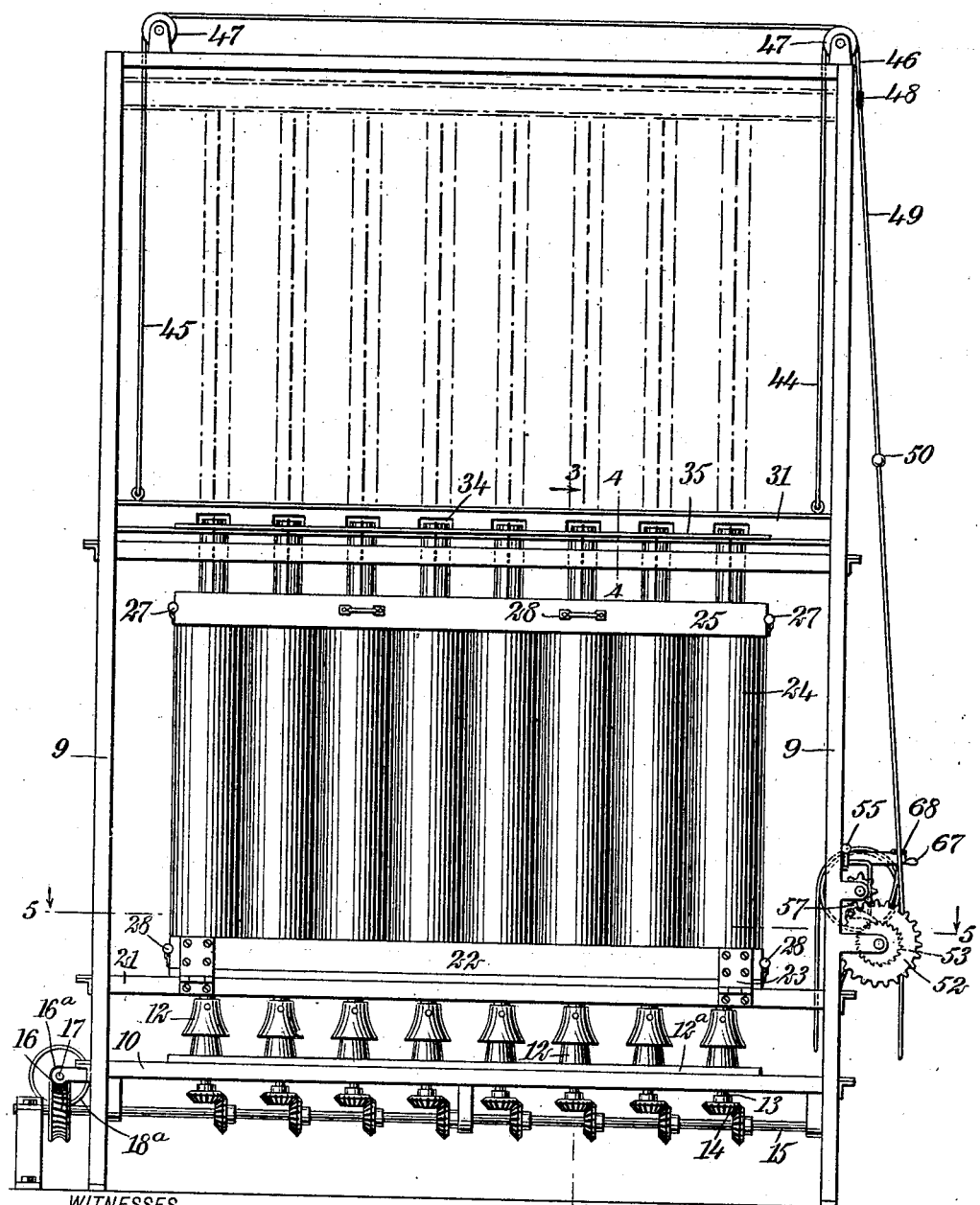
WITNESSES
Edward Thorpe.
Walton Harrison
INVENTORS
Joseph P. Costigan
John F. J. Costigan
BY Munn & Co
ATTORNEYS

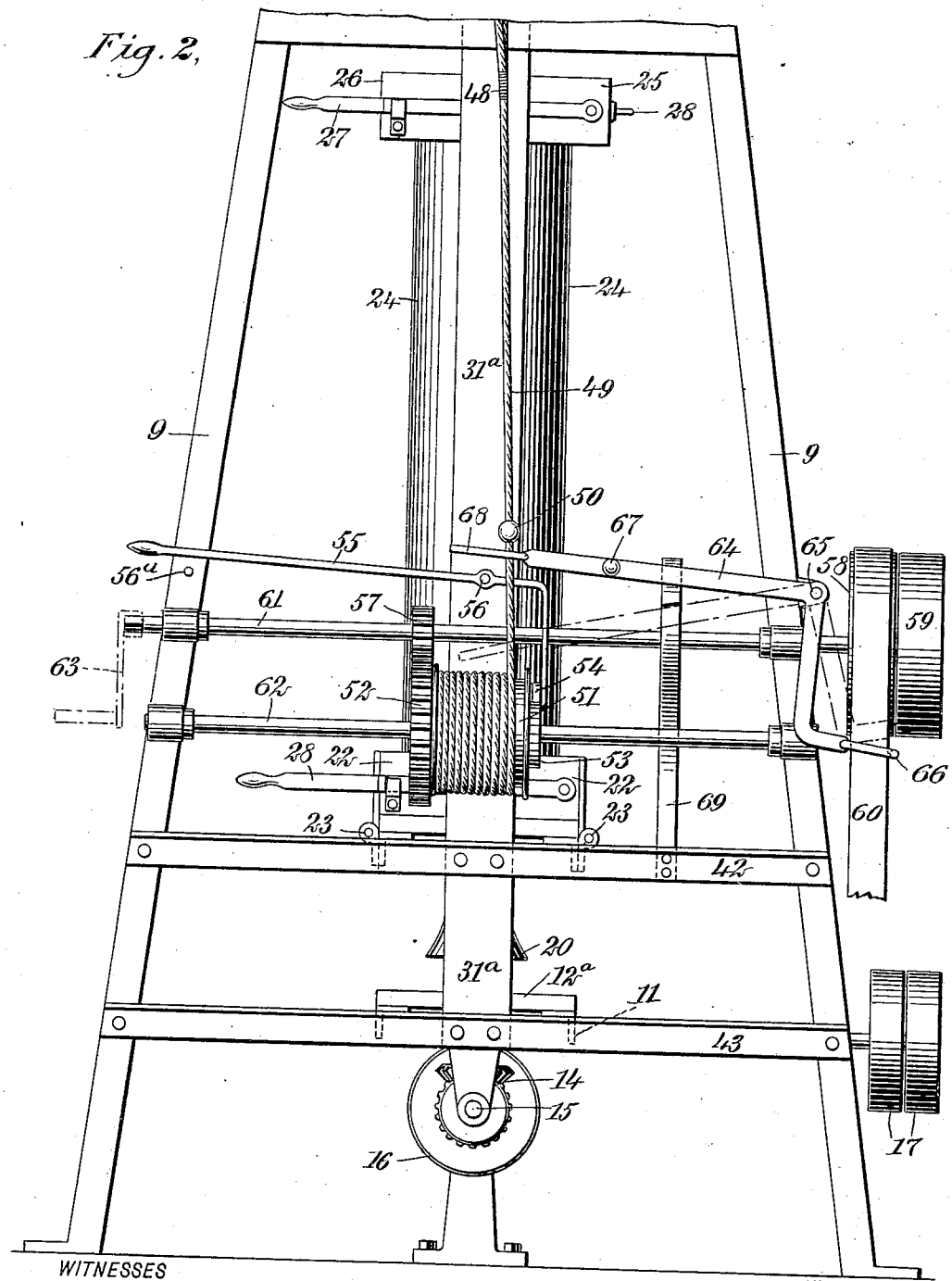

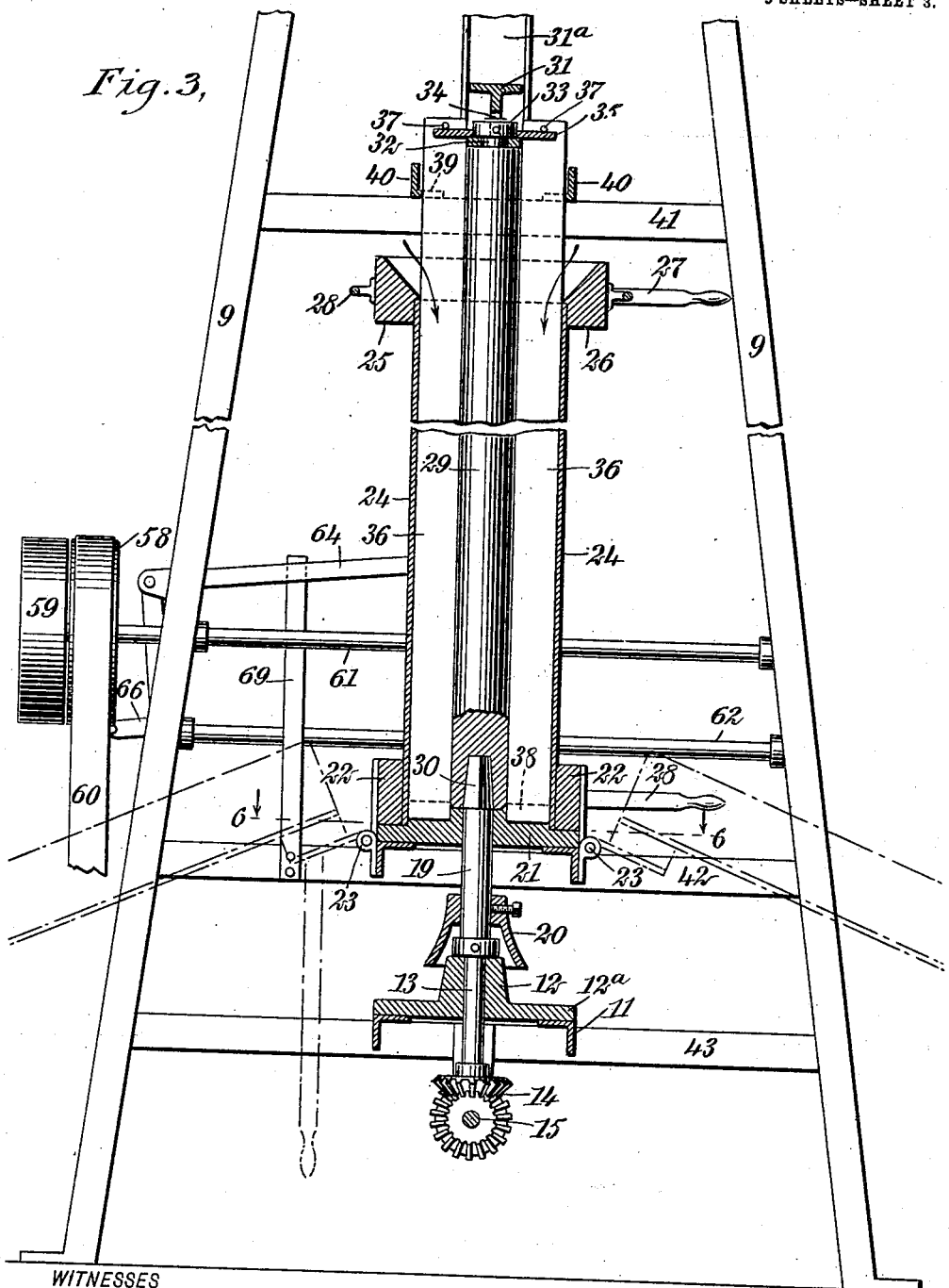

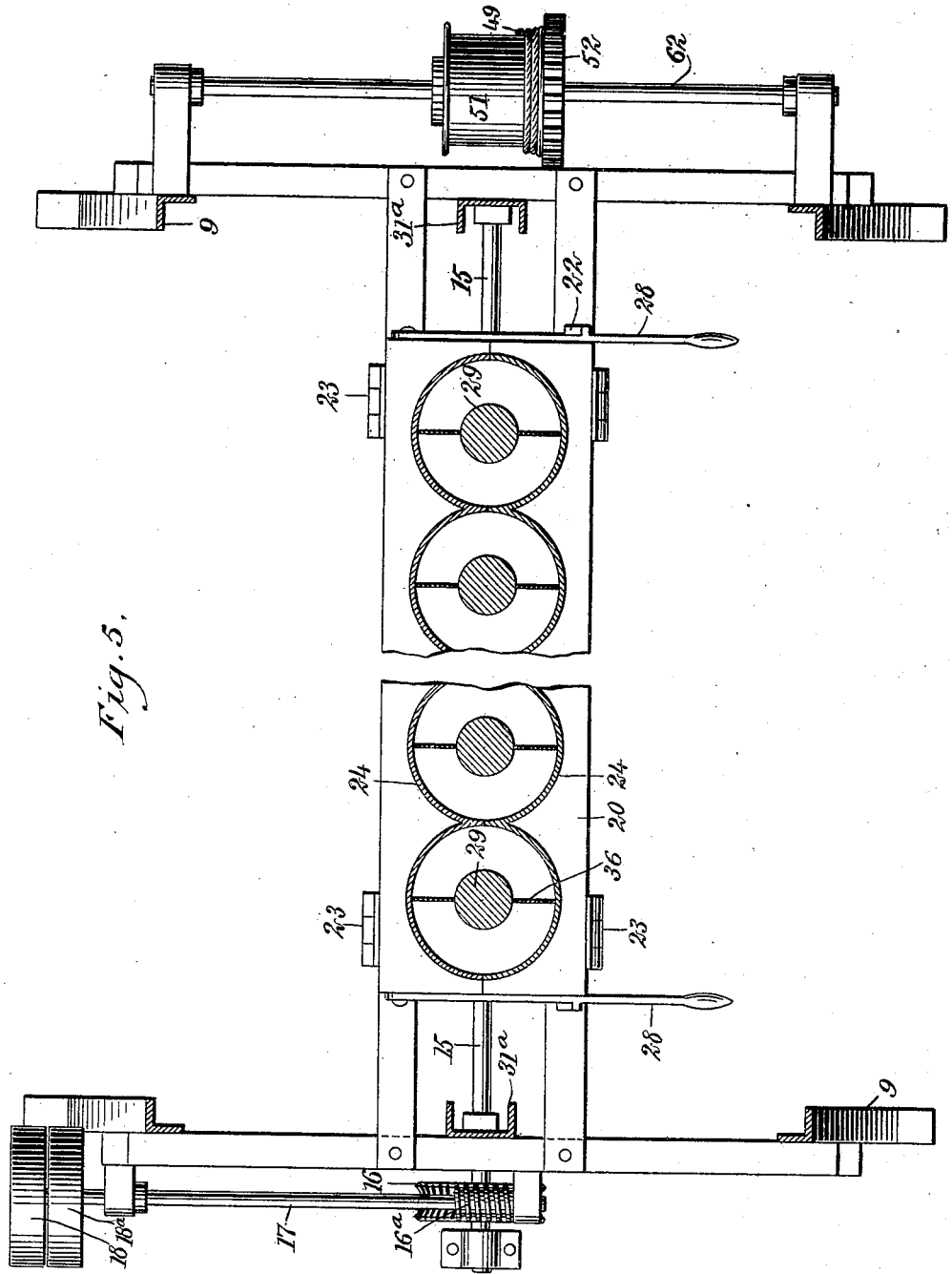

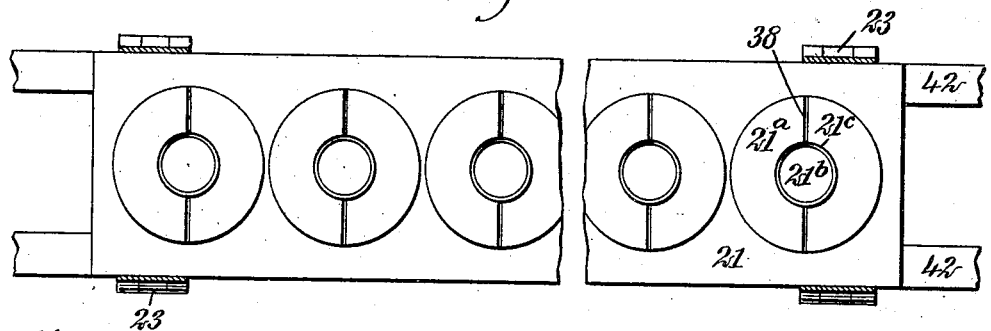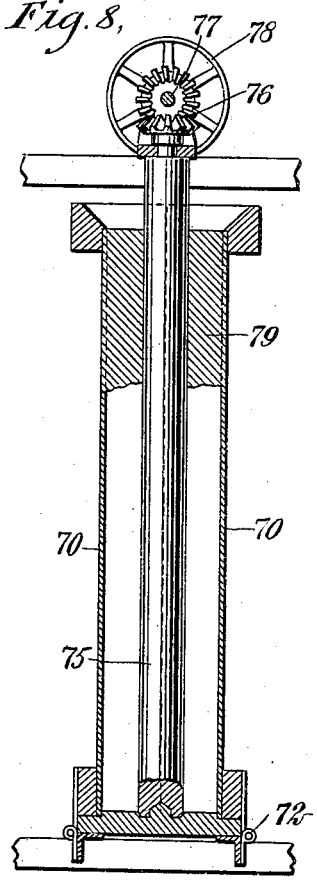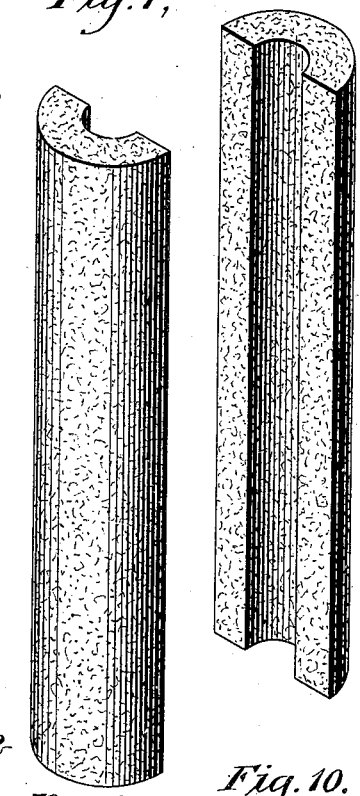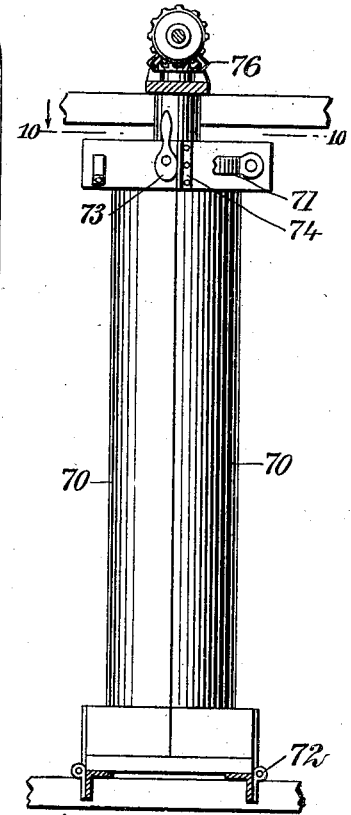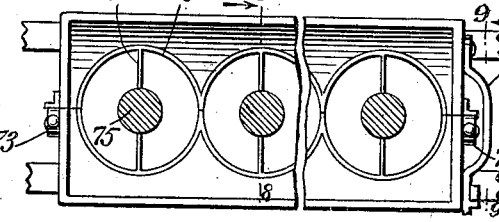

UNITED STATES PATENT OFFICE.

JOSEPH P. COSTIGAN AND JOHN F. J. COSTIGAN, OF NEW YORK, N. Y.

MOLDING-MACHINE.

No. 886,951.          Specification of Letters Patent.          Patented May 5, 1908.

Application filed October 15, 1907. Serial No. 397,564.

*To all whom it may concern:*

Be it known that we, JOSEPH P. COSTIGAN and JOHN F. J. COSTIGAN, both citizens of the United States, and residents of the city of New York, borough of Brooklyn, in the county of Kings and State of New York, have invented a new and Improved Molding-Machine, of which the following is a full, clear, and exact description.

Our invention relates to molding machines, our more particular object being to produce a machine for molding pipe coverings and the like, in semi-cylindrical sections.

Reference is to be had to the accompanying drawings forming a part of this specification, in which similar characters of reference indicate corresponding parts in all the figures.

Figure 1 is a side elevation of one form of our machine, showing the mandrels for forming the interior of the pipe coverings, the mold proper for forming the exteriors thereof, gearing for turning the mandrels to loosen them relatively to the objects molded, and mechanism for lifting the mandrels when the mold is to be opened; Fig. 2 is a fragmentary end elevation viewed as from the right of Fig. 1, showing means for automatically throwing off power when the mandrels are lifted into their highest position; Fig. 3 is a fragmentary section on the line 3—3 of Fig. 1, through the two halves of the mold showing the blades for dividing the pipe section into halves, also showing means for lifting these blades when the molding operation is completed; Fig. 4 is a sectional detail on the line 4—4 of Fig. 1, showing how the dividing blades are supported at their tops in order to enable them to be lifted; Fig. 5 is a horizontal section upon the line 5—5 of Fig. 1, looking in the direction of the arrows and showing the disposition of the two halves of the mold and the dividing blades therein, relatively to the revoluble mandrels; Fig. 6 is a horizontal section upon the line 6—6 of Fig. 3, looking in the direction of the arrows and showing the mandrel seats and also the slots for the lower ends of the dividing blades. Fig. 7 is a perspective showing two semi-cylindrical pipe covering sections made in the machine; Fig. 8 is a central vertical section on the line 8—8 of Fig. 10, through another form of the machine in which the two halves of the mold are provided with partitions rigid relatively thereto instead of using the removable dividing blades; Fig. 9 is substantially an end elevation of the mechanism shown in Fig. 8, certain supporting members being shown in section on the line 9—9 of Fig. 10; and Fig. 10 is a section upon the line 10—10 of Fig. 9, looking in the direction of the arrow, and showing the relative arrangement of the rotating mandrels and the two halves of the casing.

Two A-frames 9 are connected by a platform 10 provided with angle irons 11, and supported by these are vertical bearings 12 mounted upon a platform $12^a$. Stub shafts 13 extend through these bearings and are connected by bevel gears 14 with a horizontal shaft 15. Mounted rigidly upon this shaft is a worm wheel 16 meshing with a worm gear $16^a$, the latter being mounted rigidly upon a revoluble shaft 17 provided with fixed and loose pulleys 18, $18^a$. The stub shafts 13 are provided with enlarged portions 19 and fitted upon these are bell-shaped guards 20. A base plate 21 extends horizontally, and movable relatively to it are beams 22 which are mounted upon hinges 23 and are adapted to swing apart, as indicated by dotted lines in Fig. 3.

Extending upwardly from the beams 22 are corrugated walls 24 the general conformity of which may be understood from Fig. 5. Beams 25, 26 are mounted upon the upper edges of the walls 24 and are connected together by hand latches 27. Handles 28 are mounted upon the beams 25 in order to enable them to be pulled apart. Rotating mandrels 29 of cylindrical form are shaped at their lower ends so as to fit angular studs 30 which are integral with the stub shafts 13.

A lifting rail 31 is mounted in a slideway $31^a$. The mandrels 29 are each provided with a neck 32 and a head 33. The necks pass through the foot of the lifting rail 31 each head 33 thus occupying a slot 34 in the lifting rail. Lifting plates 35 are secured by rivets $35^a$ to the lifting rail 31 (see Fig. 4). A number of dividing blades 36 arranged in pairs are provided with supporting pins 37 which engage the lifting plate 35, so that when the lifting rail 31 is raised, the dividing plates 36 are carried upward. The lower ends of the dividing blades are adapted to occupy slots 38 in the base plate 21. The dividing blades extend through slots 39 in angle irons 40 supported upon cross beams 41, and when lifted are thus guided and given a true motion.

Cross beams 42, 43 are used for supporting various parts and for strengthening the frame. For raising the lifting rail 31, cords 44, 45 are connected with it and are brought together at 46 after passing over pulleys 47. The cords are laced together forming a junction 48, and from this junction a single cord 49 extends downwardly and is provided with a ball 50 constituting a limiting stop. The cord 49 is partially wound upon a drum 51, rigidly connected with which is a gear 52. A ratchet 53 is engaged by a pawl 54 mounted upon a hand lever 55, this hand lever working on a pivot 56. A pinion 57 meshes with the gear 52.

Fixed and loose pulleys 58, 59, actuated by a belt 60, are mounted upon a shaft 61 upon which the pinion 57 is mounted. Another revoluble shaft 62 supports the drum 51 and gear 52. By means of the pulley 58 motion may be communicated through the gears 57, 52 so as to wind the drum 51. A hand crank 63 may be mounted upon the shaft 61 and used instead of the fixed pulley 58. A shifting lever 64 is mounted upon a pivot 65 and is provided with a link 66 encircling the belt 60. These parts together constitute a shifter for the belt.

A handle 67 is mounted upon the lever 64 for enabling it to be moved by hand and for restoring it to its normal position. A link 68 encircles the cord 59 and is adapted to be moved by the ball 50 when the drum 51 is turned to a predetermined extent. A leaf spring 69 presses against the shifting lever 64 to hold it in a definite position.

The apparatus above described is used as follows: The beams 25, 26 carrying the walls 24 are raised as shown in full lines in Fig. 3, and secured firmly together by the hand latches 27. Power being now applied through pulley 18 or 18ᵃ, shaft 17, worm gear 16ᵃ, worm 16, shaft 15 and bevel gears 14 to the stub shafts 13, the mandrels 29 are rotated. The raw material to be used in molding is now filled in between the two walls 24 and worked down around the mandrels. If desired, the rotation of the mandrels may not be started until after the material is fully or partially filled in. By the rotation of the mandrels the material is prevented from sticking to them. The mold being filled power is next applied through pulley 58, shaft 61, pinion 57, and gear 52 to the drum 51. This draws the cord 49, and the ball 50 descends and finally lowers the link 68, moving the shifting lever 64 and thus shifting the belt 60 to the loose pulley 59. During this time the lifting rail 31 is raised and the shifting of the belt 60 takes place at the instant when the rail 31 reaches its highest point indicated in dotted lines in Fig. 1. Power is thus automatically cut off as soon as the lifting is completed. The dividing blades 36 and the mandrels 29 are thus raised out of the mold. The hand latches 27 being now loosened, the walls 24 fall apart, being assisted, if need be, by the operator pulling upon the handles 28. The complete molded sections, as shown in Fig. 7, are next removed without any difficulty.

In the form shown in Figs. 8, 9 and 10, the two walls are shown at 70 and are connected together by hand latches 71 and free to swing upon hinges 72. A cam 73 and pressure plate 74 are employed to assist in forcing the walls 70 apart. The mandrels 75 are turned by bevel gears 76, the latter being driven by a shaft 77 and pulley 78. Partitions 79 are mounted integrally in the walls 70 and perform generally the same office as that above described for the dividing blades. In the form shown in Figs. 8, 9 and 10, however, the mandrels are not removable. The two walls being brought together and secured by the hand latches, the material is filled in. Then, to remove the finished articles, the hand latches are loosened, the walls 70 swung apart and the finished sections removed.

The machine above described may be used for molding pipes either in the form of cylinders or semi-cylinders, as desired. The blades 36, 79 are removable from their mountings, and when removed the machine is ready for forming hollow cylinders. This, in the case of pipe coverings, may, after drying, be sawed into semi-cylinders. In case the pipes are made of a more dense material, such as Portland cement, fire clay, terracotta, and the like, they remain in cylindrical form. The machine may be used for forming hollow blocks for lining the shafts of elevators or for use in fireproofing and in constructions intended to be non-conducting of heat. Boiler coverings, for instance, may be formed by changing the gates so as to give the shape and surface desired. In manufacturing coverings for the non-conduction of heat, the material being poured in in a semi-liquid state may be formed into cylinders and afterward sawed into semi-cylinders, the mandrels or cores being of a size to correspond to the size of the pipe for which said covering is intended. We prefer, however, to divide the cylinders in the machine, as above shown in detail, and to accomplish this all in one operation, though we do not limit ourselves to this particular manner of operation.

Since the dividing blades are detachable and can be changed so as to make other cylindrical or semi-cylindrical articles, and the outer shell being hinged, the machine can make a variety of distinct products. This machine is adapted to make drain pipe, flue linings, hollow blocks having either cylindrical, semi-cylindrical or rectangular form, by changing the outer hinged form. An important feature used in this operation is the detachable mandrels 29 and the various angular studs 30, whereby the mandrels are rotated; also the means for raising and lowering the mandrels by the rotation of a drum in order to cause the mandrels to engage and disengage the studs.

Having thus described our invention, we claim as new and desire to secure by Letters Patent:

1. In a molding machine, the combination of walls movable relatively to each other for molding and disengaging a mass of material of substantially cylindrical form, a mandrel mounted centrally intermediate said walls and concentric thereto, means for turning said mandrel, dividing blades arranged in pairs and disposed intermediate said walls for the purpose of dividing the article molded, and means for lifting said dividing blades endwise so as to remove them.

2. In a molding machine, the combination of walls, one movable relatively to the other and forming a mold, a mandrel normally mounted within said mold, a revoluble stud extending into said mold and normally supporting said mandrel, and means for lifting said mandrel away from said stud so as to disengage said mandrel from the article molded.

3. The combination of walls adapted to move toward and from each other, said walls constituting a mold, a stud of angular conformity projecting into said mold, gearing for turning said stud, a mandrel disposed intermediate said walls and provided with a socket for receiving said stud, and means controllable at will for disengaging said mandrel from said stud and lifting said mandrel out of said mold.

4. The combination of walls, one of which is movable toward and from another, a mandrel mounted intermediate said walls and provided with an opening, a revoluble member extending intermediate said walls and provided with a portion for projecting into said opening in order to turn said mandrel, and means for turning said revoluble member.

5. The combination of a bottom provided with slots, walls mounted upon said bottom and adapted to swing toward and from each other, said walls being provided with means for shaping the external surface of an object to be molded, dividing blades disposed normally intermediate said walls, said dividing blades fitting into said slots, a mandrel disposed intermediate said dividing blades, a revoluble member extending through said bottom and engaging said mandrel for the purpose of turning the latter, means for raising said dividing blades so as to disengage the same from said slots, and to lift said dividing blades above said walls, and means for locking said walls temporarily in predetermined position.

6. The combination of a frame, bearings mounted thereupon, a plurality of revoluble studs journaled within said bearings, bell-shaped guards mounted upon said studs for shielding said bearings, a bottom through which said studs extend, walls mounted upon said bottom and adapted to move toward and from each other, mandrels disposed intermediate said walls and adapted to engage said studs so as to be turned thereby, dividing blades disposed intermediate said walls and normally engaging said bottom, and means for lifting said dividing blades out of engagement with said bottom and raising them above said walls.

In testimony whereof we have signed our names to this specification in the presence of two subscribing witnesses.

JOSEPH P. COSTIGAN.
JOHN F. J. COSTIGAN.

Witnesses:
WALTON HARRISON,
EVERARD B. MARSHALL.